(12) United States Patent
Morita et al.

(10) Patent No.: US 9,942,434 B1
(45) Date of Patent: Apr. 10, 2018

(54) DOCUMENT FEEDER, IMAGE READING DEVICE, AND IMAGE FORMING APPARATUS

(71) Applicant: FUJI XEROX CO., LTD., Tokyo (JP)

(72) Inventors: Miho Morita, Kanagawa (JP); Akira Yamazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/487,654

(22) Filed: Apr. 14, 2017

(30) Foreign Application Priority Data

Sep. 30, 2016 (JP) .................................. 2016-192410

(51) Int. Cl.
H04N 1/04 (2006.01)
H04N 1/00 (2006.01)

(52) U.S. Cl.
CPC ........... *H04N 1/04* (2013.01); *H04N 1/00602* (2013.01); *H04N 1/00615* (2013.01); *H04N 1/00628* (2013.01); *H04N 2201/0063* (2013.01); *H04N 2201/0081* (2013.01)

(58) Field of Classification Search
CPC ........ B65H 2405/1112; B65H 2801/06; B65H 3/0684; B65H 3/5223; B65H 1/04; B65H 2402/441; B65H 2404/611; B65H 2404/722; B65H 2404/725; B65H 2405/1132; B65H 2405/1134; B65H 2405/1136; B65H 3/34
USPC ........................... 271/121, 18; 358/1.12, 498
See application file for complete search history.

(56) References Cited

U.S. PATENT DOCUMENTS

| 4,508,444 A | * | 4/1985 | May | B65H 9/166 271/10.09 |
| 5,060,018 A | * | 10/1991 | Watanabe | G03B 27/6264 355/75 |
| 5,624,107 A | * | 4/1997 | Deguchi | G03G 15/60 271/145 |
| 6,955,351 B2 | * | 10/2005 | Sueoka | B65H 7/08 271/258.01 |
| 8,264,714 B2 | * | 9/2012 | Matsui | B65H 5/00 271/264 |
| 8,322,710 B2 | * | 12/2012 | Andoh | B65H 7/04 271/145 |
| 8,444,135 B2 | * | 5/2013 | Morita | B65H 7/14 271/265.01 |

(Continued)

FOREIGN PATENT DOCUMENTS

JP 2014-231417 A 12/2014

*Primary Examiner* — Negussie Worku
(74) *Attorney, Agent, or Firm* — Sughrue Mion, PLLC

(57) ABSTRACT

A document feeder includes
a document loading unit loaded with a document thereon and supported to be movable between (i) a loading position where the document can be loaded and (ii) an opened position where a space at a lower side of the document loading unit in a direction of gravity is opened,
a separation unit including a feed roller and a separation roller being in pressure contact with the feed roller, the separation unit that separates the document fed from the document loading unit by a nip between the feed roller and the separation roller, and
a guide member that guides the document fed from the document loading unit to the nip of the separation unit. When the document loading unit moves to the opened position, the separation roller and the guide member move to be spaced apart from each other.

12 Claims, 6 Drawing Sheets

(56) References Cited

U.S. PATENT DOCUMENTS

| | | | |
|---|---|---|---|
| 2013/0135645 A1* | 5/2013 | Horiguchi | G06K 15/02 358/1.13 |
| 2014/0078528 A1* | 3/2014 | Muraoka | B65H 3/0669 358/1.12 |
| 2014/0353904 A1 | 12/2014 | Tahara et al. | |
| 2016/0023857 A1* | 1/2016 | Nakata | B65H 5/062 271/227 |
| 2016/0257511 A1* | 9/2016 | Machida | B65H 1/04 |

* cited by examiner

DOCUMENT FEEDER, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2016-192410 filed Sep. 30, 2016.

BACKGROUND

Technical Field

The present invention relates to a document feeder, an image reading device, and an image forming apparatus.

SUMMARY

According to an aspect of the invention, a document feeder includes a document loading unit loaded with a document thereon and supported to be movable between (i) a loading position where the document can be loaded and (ii) an opened position where a space at a lower side of the document loading unit in a direction of gravity is opened, a separation unit including a feed roller and a separation roller being in pressure contact with the feed roller, the separation unit that separates the document fed from the document loading unit by a nip between the feed roller and the separation roller, and a guide member that guides the document fed from the document loading unit to the nip of the separation unit. When the document loading unit moves to the opened position, the separation roller and the guide member move to be spaced apart from each other.

BRIEF DESCRIPTION OF THE DRAWINGS

Exemplary embodiments of the present invention will be described in detail based on the following figures, wherein.

DETAILED DESCRIPTION

Next, the present invention will be described in more detail, by exemplifying the following exemplary embodiments and specific examples, with reference to the drawings, but the present invention is not limited to these exemplary embodiments and specific examples.

In the following description made with reference to the drawings, it shall be noted that the drawings are schematic, and dimensions and ratios are different from actual dimensions and ratios, and illustrations of members, except for members required for the description, are properly omitted for easy understanding.

(1) Entire Configuration and Operation of Image Forming Apparatus

Figure 1:
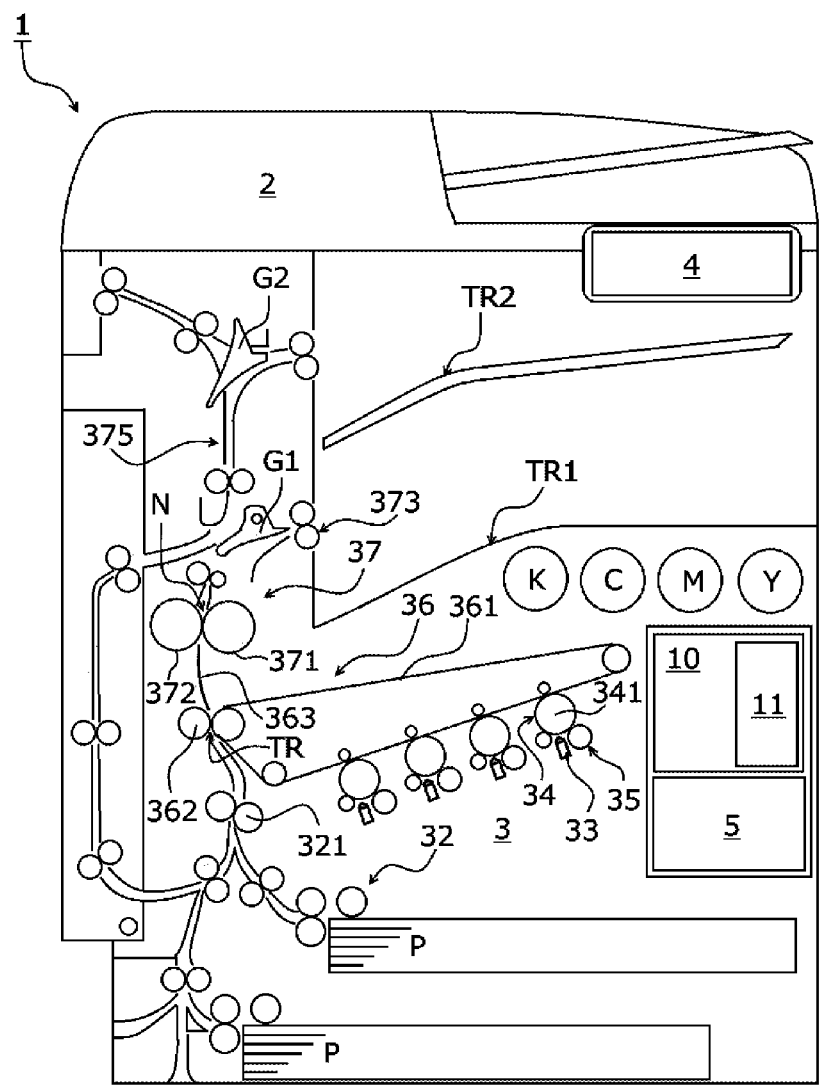
FIG. 1 is a cross-sectional schematic view illustrating an internal configuration of an image forming apparatus.
Figure 2:
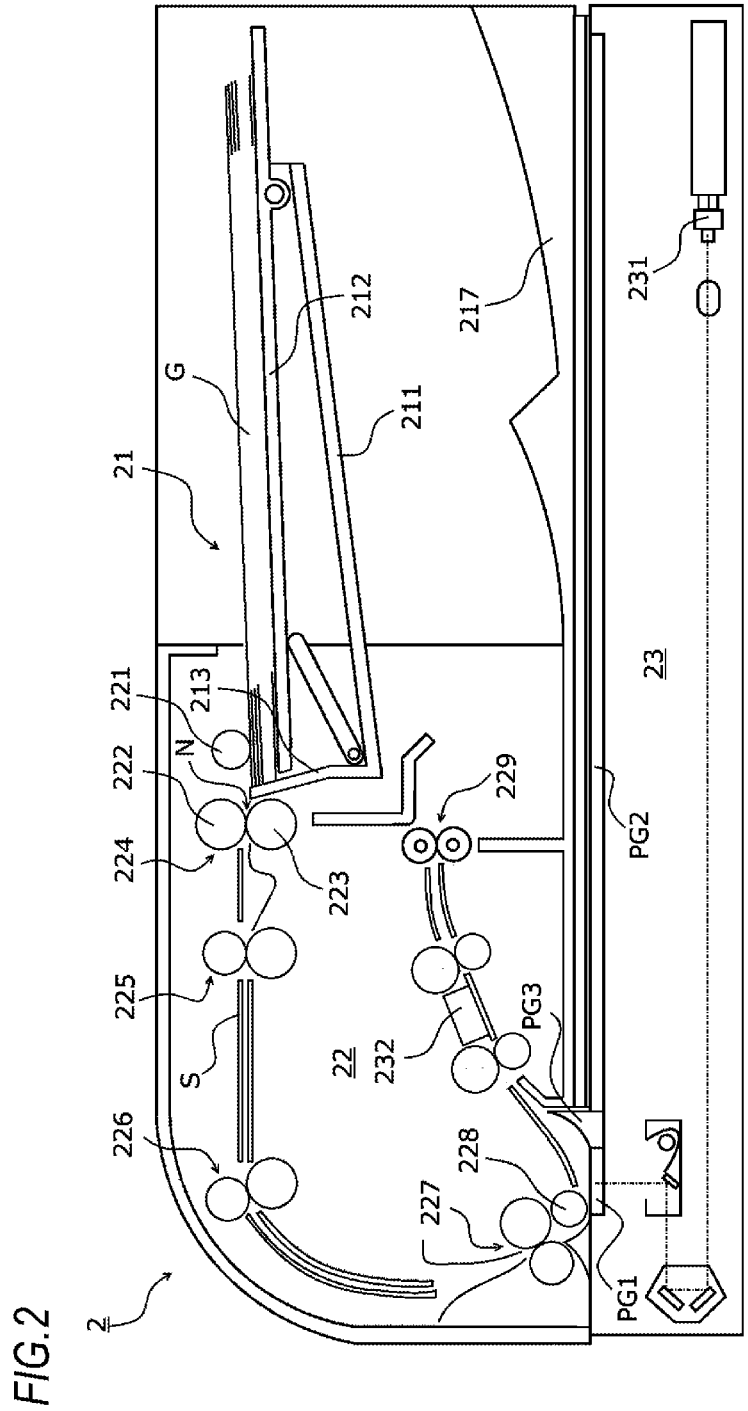
FIG. 2 is a cross-sectional configuration view illustrating an internal configuration of a reading unit.

FIG. 1 is a cross-sectional schematic view illustrating an internal configuration of an image forming apparatus 1 according to the present exemplary embodiment. FIG. 2 is a cross-sectional configuration view illustrating an internal configuration of a reading unit 2.

Hereinafter, the entire configuration and operation of the image forming apparatus 1 will be described with reference to the drawings.

(1.1) Entire Configuration

The image forming apparatus 1 is configured to include a reading unit 2 as a reading part that reads an image from a document and converts the image into image data, an image forming unit 3 as a printing part that prints the read image data on a sheet as a recording medium, an operation information unit 4 as a user interface, and an image processing unit 5.

The reading unit 2 is configured to include a document loading unit 21, an automatic document feeding unit 22, and an image reading unit 23. The automatic document feeding unit 22 transports a document G placed on the document loading unit 21 to a reading position of the image reading unit 23. An image read by an image sensor (not illustrated) such as a charge coupled device (CCD) line sensor in the image reading unit 23 is converted into image data which is an electrical signal.

The image forming unit 3 is configured to include a sheet feeding device 32, exposure devices 33, photoconductor units 34, developing devices 35, a transfer device 36, and a fixing device 37, and forms a toner image, based on image information received from the image processing unit 5, on a sheet P fed from the sheet feeding device 32.

As a user interface, the operation information unit 4 is disposed at the front surface side of the reading unit 2. The operation information unit 4 is configured by combining a liquid crystal display panel, various operation buttons, and a touch panel, and a user of the image forming apparatus 1 inputs various types of setting or instructions through the operation information unit 4. In addition, various types of information are displayed to the user of the image forming apparatus 1 through the liquid crystal display panel.

The image processing unit 5 creates image data based on the image read by the reading unit 2 and printing information transmitted from an external device (e.g., a personal computer).

(1.2) Reading Unit

The reading unit 2 includes the document loading unit 21, the automatic document feeding unit 22, and the image reading unit 23. Further, the document loading unit 21 and the automatic document feeding unit 22 are connected to be openable upwardly of the image reading unit 23.

The document loading unit 21 includes a lift plate 212 on which the document G with a recorded image is placed. The lift plate 212 is movable upward and downward in accordance with the number of sheets of document G to be loaded thereon, and retains the document G at a position where the lift plate 212 has moved upward so that the upper surface of the document G comes into contact with a nudger roller 221.

The automatic document feeding unit 22 includes the nudger roller 221 that extracts the document G loaded on the lift plate 212 sequentially from the top, and a separation unit 224 including a feed roller 222 as a feed roller and a retard roller 223 as a separation roller that is in pressure contact with the feed roller 222.

In the separation unit 224, the feed roller 222 and the retard roller 223 are arranged in a pair. When the documents G are fed to a nip portion N in a state in which the documents G overlap each other, the separation unit 224 separates (divides) the documents G, and transports the documents G one by one to the image reading unit 23.

In a transport path S, transport rollers 225 are disposed at a position at the downstream side of the feed roller 222 in a transport direction of the document G. The rotation of the transport rollers 225 is controlled by a clutch (not illustrated), and the transport rollers 225 form a loop by temporarily stopping the document G fed from the feed roller 222, and transports the document G to pre-registration rollers 226 while correcting a skew.

Registration rollers 227, which adjust a feed timing of the document G, are disposed at the downstream side of the pre-registration rollers 226. The pre-registration rollers 226 correct a skew by forming a loop in a state in which a leading end of the document G is abutted to the registration rollers 227 in a stopped state. The registration rollers 227 are driven in accordance with the timing of starting the reading, and the front side of the document G is read by the image reading unit 23 by being pressed against a document passing surface PG1 by a platen roller 228 in a state in which the loop is maintained by the transport rollers 225 and the pre-registration rollers 226.

A document placement surface PG2, on which the document G placed by an operator is supported, is disposed at the right side of the document passing surface PG1. A document guide PG3 is disposed between the document passing surface PG1 and the document placement surface PG2, and the document G passing through the document passing surface PG1 is transported to a reading sensor 232 by being guided by the document guide PG3. The document G, of which the front side has been read by the image reading unit 23, is ejected, by ejection rollers 229, to a sheet ejection unit 217 formed at a lower side of the document loading unit 21 while the back side of the document G is read by the reading sensor 232.

An image reading sensor 231, which optically reads an image of the document G and converts the image into an electrical signal, is provided at a lower side of the document placement surface PG22, and reads an image of the document G which passes over the document passing surface PG1 or an image of the document G provided on the document placement surface PG2. The read image is converted into image data which is an electrical signal.

(1.3) Image Forming Unit

In the image forming unit 3, a designated sheet P is transported to the image forming unit 3 from the sheet feeding device 32 per each page of printing in a printing job in accordance with an image forming timing.

The photoconductor units 34 are provided in parallel above (in the Z direction) the sheet feeding device 32, and each of the photoconductor units 34 includes a rotationally driven photoconductor drum 341. Toner images of yellow (Y), magenta (M), cyan (C), and black (K) are formed, by the respective developing devices 35, on the respective photoconductor drums 341 on which electrostatic latent images have been formed by the exposure devices 33.

The toner images of the respective colors formed on the photoconductor drums 341 of the respective photoconductor units 34 are sequentially transferred in an electrostatic manner (primary transfer) on an intermediate transfer belt 361 of the transfer device 36, such that superimposed toner images, on which the toners of the respective colors are superimposed, are formed. The superimposed toner images on the intermediate transfer belt 361 are transferred in a lump by secondary transfer rollers 362 to the sheet P transported from a pair of registration rollers 321 and guided by a transport guide.

The fixing device 37 has a fixing nip FN (fixing region) formed by a pressure contact region between a heating module 371 and a pressure module 372 which are arranged in a pair.

The sheet P to which the toner images have been transferred in a lump in the transfer device 36 is transported to the fixing nip FN of the fixing device 37 through a transport guide 363 in a state in which the toner images are unfixed, and the toner images are fixed by pressing and heating operations by the heating module 371 and the pressure module 372 which are arranged in a pair.

The sheet P on which the fixed toner images have been formed is guided to a switching gate G1, and ejected and accommodated in an ejection tray unit TR1 on the upper surface of the image forming apparatus 1 from a pair of first ejection rollers 373. In addition, in a case in which the sheet P is reversed for duplex printing, or ejected in a state in which an image recorded surface is directed upward, the transport direction is changed toward a transport path 375 by the switching gate G1.

(2) Configurations and Operations of Document Loading Unit and Separation Unit

Figure 3:
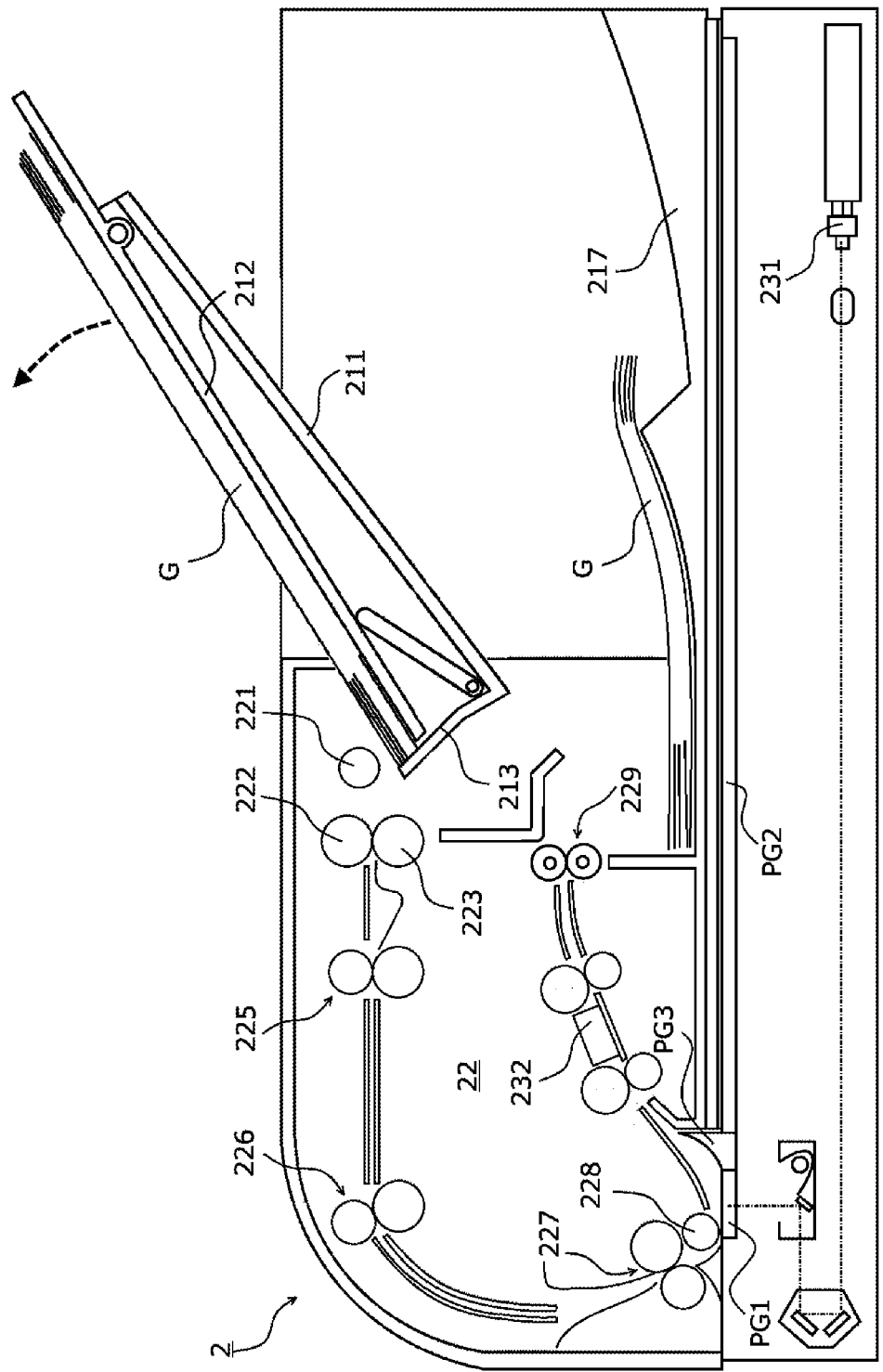
FIG. 3 is a cross-sectional configuration view illustrating an internal configuration of the reading unit in which a document loading unit is retained at an opened position.
Figure 4:
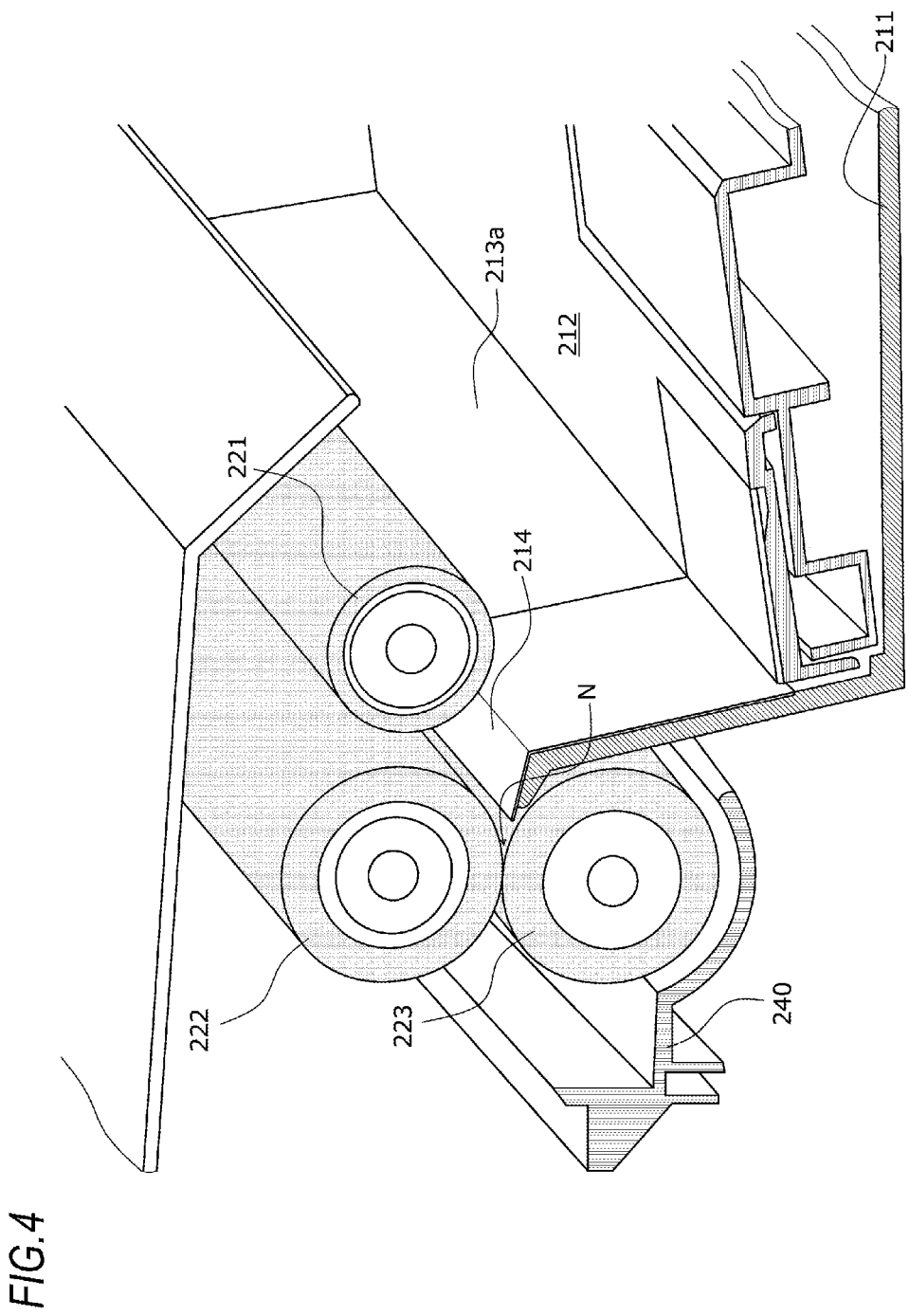
FIG. 4 is a cross-sectional perspective view illustrating configurations of the document loading unit and a separation unit.
Figure 5A:
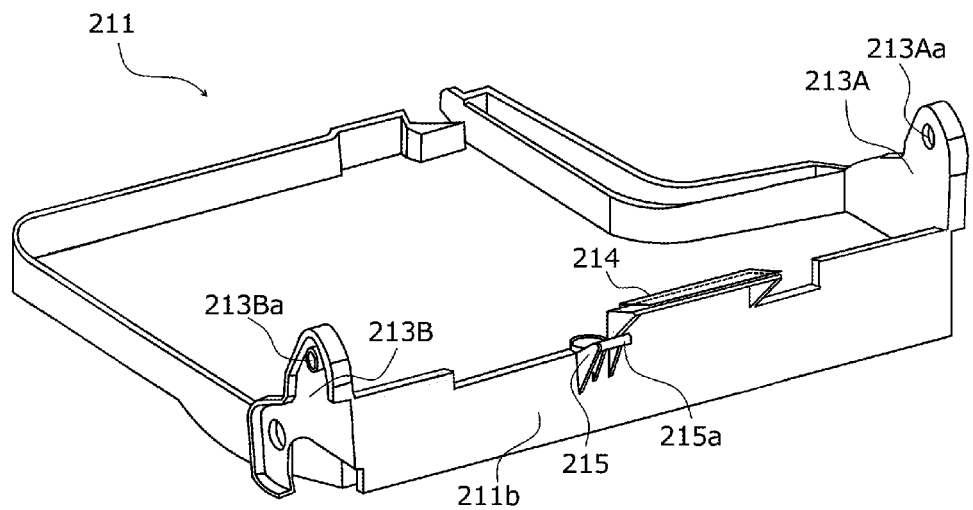
FIG. 5A is a perspective view of a tray body of the document loading unit.
Figure 5B:
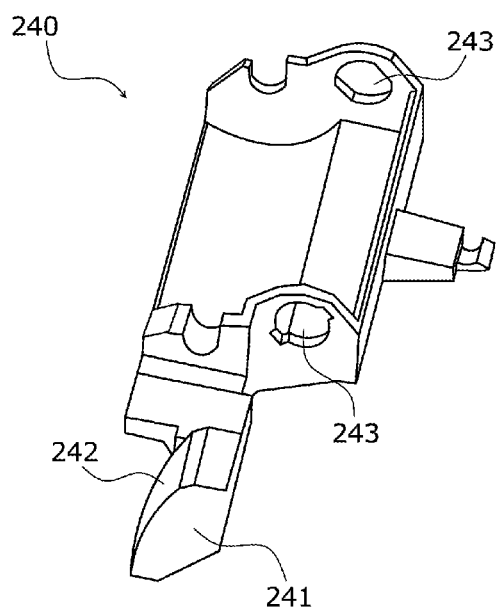
FIG. 5B is a perspective view of a retard holder.
Figure 6A:
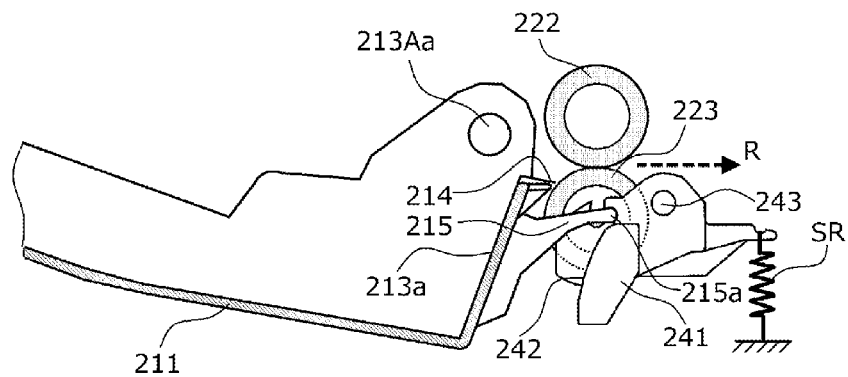
FIGS. 6A to 6C are cross-sectional schematic views explaining movements of a Mylar film and a retard roller associated with a rotational operation of the tray body.
Figure 6B:
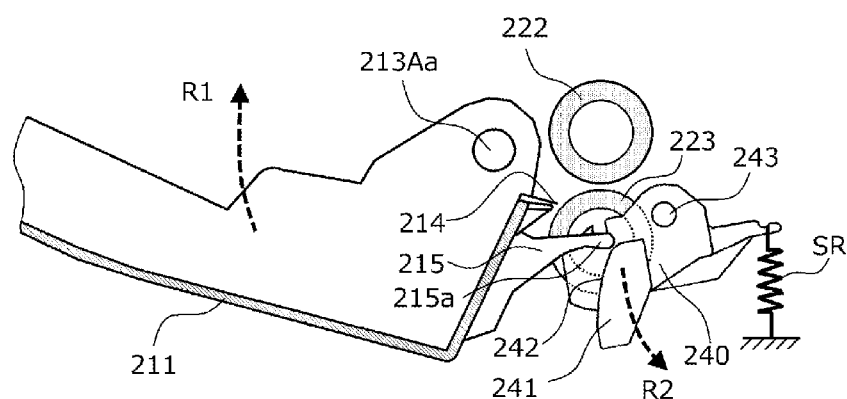
Figure 6C:
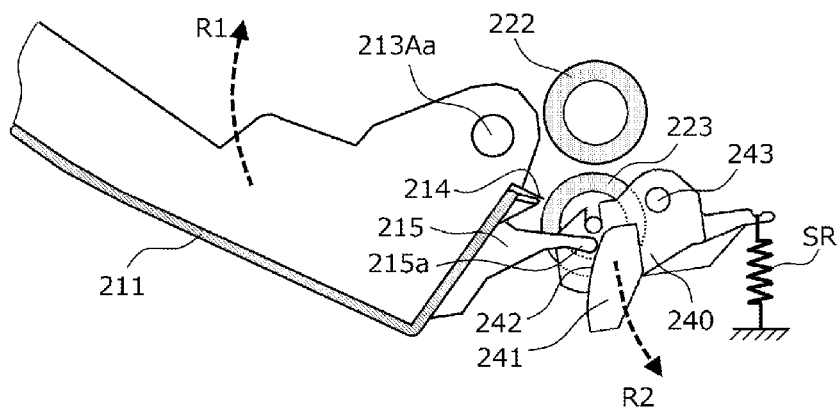

FIG. 3 is a cross-sectional configuration view illustrating an internal configuration of the reading unit 2 in which the document loading unit 21 is retained in an opened position. FIG. 4 is a cross-sectional perspective view illustrating configurations of the document loading unit 21 and the separation unit 224. FIG. 5A is a perspective view of a tray body 211 of the document loading unit 21. FIG. 5B is a perspective view of a retard holder 240. FIGS. 6A to 6C are cross-sectional schematic views explaining movements of a Mylar film 214 and the retard roller 223 associated with a rotational operation of the tray body 211. Hereinafter, configurations and operations of the document loading unit 21 and the separation unit 224 will be described with reference to the drawings.

(2.1) Entire Configurations of Document Loading Unit and Separation Unit

The automatic document feeding unit 22 has the separation unit 224 that separates the documents G, which is fed from the document loading unit 21 by the nudger roller 221, one by one, and that feeds the document G to the image reading unit 23.

As illustrated in FIG. 4, in the document loading unit 21, the lift plate 212 is supported on the tray body 211 so as to be movable upward and downward, and a document end alignment portion 213 is formed at a document feeding side. The document end alignment portion 213 is formed in the vicinity of the retard roller 223, and the nudger roller 221 is disposed in the vicinity of the feed roller 222 at an upper side of the document end alignment portion 213.

As an example of a guide member that guides the document G sent by the nudger roller 221 to the separation unit 224, the Mylar film 214 is fixed to the document end alignment portion 213 of the document loading unit 21 so as to cover the retard roller 223 at the tip end side thereof.

As such, since the nudger roller 221 is disposed in the vicinity of the separation unit 224 to feed the document G, the size of the reading unit 2 is reduced, and the reading process is increased in speed.

(2.2) Document Loading Unit

The document loading unit 21 includes the tray body 211, and the lift plate 212 rotatably supported on the tray body 211, and the document G is loaded on the upper surface 212a of the lift plate 212.

The document end alignment portion 213 in the shape of a standing wall standing upward (in the Z direction) from the left end of the tray body 211 is formed at the left end portion (in a −X direction) of the tray body 211, and the leading ends of the documents G loaded on the upper surface 212a of the lift plate 212 are aligned as one end side of the documents G (the leading end side in the document feeding direction) comes into contact with the document end alignment portion 213.

At the both front and rear (in the Y direction) end portions of the tray body 211, a front wall 213A and a rear wall 213B are formed in the shape of a standing wall standing upward from the left end portion of the tray body 211. Support holes 213Aa and 213Ba are formed in the front wall 213A and the rear wall 213B, respectively, so that the tray body 211 is rotatably supported to be movable between a loading position (illustrated in FIG. 2) where documents G may be loaded on the tray body 211, and an opened position (illustrated in FIG. 3) where a space at the lower side of the tray body 211 in the direction of gravity is opened so that the documents in the sheet ejection unit 217 is extracted.

As an example of a guide member, the Mylar film 214 having a width for covering the retard roller 223 is bonded and fixed, at one end thereof, to a central portion of an inner surface 213a of the document end alignment portion 213.

The other end side (leading end side) of the Mylar film 214 is a free end bent with respect to the document end alignment portion 213, and is disposed to cover the retard roller 223 at the upstream side of the nip portion N of the separation unit 224 in a document feeding direction in a state in which the tray body 211 is positioned at a loading position. As a result, the Mylar film 214 reliably guides a thin paper document fed by the nudger roller 221 to the nip portion N, and prevents the damage of the leading ends of the documents G.

A projection portion 215 is provided on an outer surface 213b of the document end alignment portion 213 to protrude toward the separation unit 224. The projection portion 215 comes into contact with an arm portion 241 formed to protrude at one end of the retard holder 240 to be described below so as to release the nip of the retard roller 223 along with the rotational movement of the tray body 211.

(2.3) Separation Unit

At the downstream side of the document loading unit 21 in the document feeding direction, the separation unit 224 includes the feed roller 222 and the retard roller 223 which comes into pressure contact with the feed roller 222 so as to form the nip portion N. The feed roller 222 rotates in the same direction as the nudger roller 221, and transports the document G fed from the nudger roller 221 to a further downstream side in the transport direction.

Power is transmitted to the retard roller 223 through a torque limiter (not illustrated) so that the retard roller 223 is rotated in the reverse direction to the document transport direction. As the feed roller 222, which is in pressure contact with the retard roller 223, rotates in the document transport direction, a torque is applied to the retard roller 223 in the document transport direction. The set torque of the torque limiter is set to a value smaller than the torque applied from the feed roller 222 by the retard roller 223, and as a result, the retard roller 223 is driven to rotate by receiving the rotation of the feed roller 222 in the document transport direction.

In a case in which two or more sheets of documents are sent to the nip portion N of the separation unit 224 (in a case of multi-feed), the retard roller 223, to which power is transmitted by the operation of the torque limiter in the reverse direction to the document transport direction, rotates in the reverse direction to the document transport direction because a coefficient of friction between the documents is smaller than that among the feed roller 222, the retard roller 223, and the document G. As a result, except for the uppermost document, the documents G return back in the direction toward the document loading unit 21, and the documents G are divided to be separated.

The retard roller 223 is rotatably supported on the retard holder 240 as an example of a retaining member. Rotation support holes 243 are formed at a downstream side of the retard holder 240 in the document feeding direction with respect to the retard roller 223, and the retard roller 223 is supported to be movable between a separation position where the nip is formed as the retard roller 223 comes into contact with the feed roller 222 and a retraction position where the nip is released.

As a biasing member, a tension coil spring SR is tensely arranged at the downstream side of the retard holder 240 in the document feeding direction, and the retard roller 223 is biased so as to be in pressure contact with the feed roller 222 (see FIG. 6A).

The arm portion 241 is formed at a lateral portion of the retard holder 240 to protrude in a rotation axis direction of the retard roller 223. The arm portion 241 has a cam surface 242 formed to be inclined in the movement direction of the retard holder 240, and the retard holder 240 is rotated as a tip end portion 215a of the projection portion 215 of the tray body 211 comes into contact with the cam surface 242.

(2.4) Rotational Movement of Tray Body

As illustrated in FIG. 6A, the document loading unit 21 and the separation unit 224 configured as described above are arranged such that, when the document G is fed, the document loading unit 21 is positioned at the loading position, and the leading end 214b of the Mylar film 214 is disposed to cover the retard roller 223.

In the state in which the document loading unit 21 is positioned at the loading position as described above, since the Mylar film 214, as a guide member, covers the upper surface of the retard roller 223, it is required to separate the Mylar film 214 from the upper side of the retard roller 223 in the case of replacing the retard roller 223.

In the present exemplary embodiment, as illustrated in FIG. 6B, when the tray body 211 is rotationally moved from a carrying position to an opened position (the arrow R1 in FIG. 6B), the tip end portion 215a of the projection portion 215 of the tray body 211 first comes into contact with the cam surface 242 of the arm portion 241 of the retard holder 240, and thus the retard holder 240 rotates (the arrow R2 in FIG. 6B).

Since the rotation support hole 243, which serves as a rotation support point, is formed at the downstream side in the document feeding direction with respect to the retard roller 223, the retard roller 223 moves along with the rotation of the retard holder 240 so as to be spaced apart from the feed roller 222, and also spaced apart from the Mylar film 214.

Since the support holes 213Aa and 213Ba of the tray body 211, which serve as rotation support points, are formed at the upstream side in the document feeding direction (see the arrow R in FIG. 6A) with respect to the Mylar film 214, the Mylar film 214 fixed to the document end alignment portion 213 of the tray body 211 moves along with the rotation of the tray body 211 so as to be spaced apart from the retard roller 223.

When the tray body 211 is further rotated (the arrow R1 in FIG. 6C), as illustrated in FIG. 6C, the tip end portion 215a of the projection portion 215 of the tray body 211 moves while coming into contact with the cam surface 242 of the arm portion 241 of the retard holder 240, and thus the retard holder 240 is further rotated (the arrow R2 in FIG. 6C). Further, the Mylar film 214 moves along with the rotation of the tray body 211 in a state in which the Mylar film 214 is spaced apart from the retard roller 223.

As a result, the retard roller 223 and the Mylar film 214 move along with the rotational operation of the tray body 211 so as to be spaced apart from each other, and as a result, it is possible to prevent deformation of the Mylar film 214 when the retard roller 223 is replaced.

In a case in which the reading operation is ended, and the document G ejected to the sheet ejection unit 217 is extracted, the document loading unit 21 is rotated upward so that the sheet ejection unit 217 is opened.

In this case, the retard roller 223 and the Mylar film 214 move along with the rotational operation of the tray body 211 so as to be spaced apart from each other, and as a result, the deformation of the Mylar film 214 is prevented without causing the Mylar film 214 to come into contact with the retard roller 223.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document feeder comprising:
    a document loading unit configured to be loaded a document thereon and supported to be movable between (i) a loading position where the document can be loaded and (ii) an opened position where a space at a lower side of the document loading unit in a direction of gravity is opened;
    a separation unit including a feed roller and a separation roller, the separation roller being in pressure contact with the feed roller, wherein the separation unit is configured to separate the document fed from the document loading unit by a nip formed between the feed roller and the separation roller; and
    a guide member configured to guide the document fed from the document loading unit to the nip of the separation unit,
    wherein when the document loading unit moves to the opened position, the separation roller and the guide member move to be spaced apart from each other, and
    wherein, in the loading position, the guide member is arranged between the feed roller and the separation roller.

2. The document feeder according to claim 1, wherein
    the document loading unit includes a projection portion disposed at one end side thereof to protrude toward the separation unit,
    the separation roller is rotatably supported on a retaining member that retains the separation roller to be movable between a separation position where the nip is formed and a retraction position where the nip is released, and
    when the document loading unit moves to the opened position, the guide member moves toward an upstream side in a document feeding direction, and the nip is released as the projection portion comes into contact with an arm portion provided on the retaining member to protrude, so that the separation roller moves toward a downstream side in the document feeding direction.

3. The document feeder according to claim 2, wherein the guide member is a film-shaped Mylar having one end fixed to the document loading unit, and the other end protruding to cover the separation roller at an upstream side of the nip in the document feeding direction.

4. An image reading device comprising:
    an image capturing member configured to read an image of a document; and
    the document feeder according to claim 2 further configured to feed the document to a reading position where the image capturing member is configured to read the document.

5. An image forming apparatus comprising:
    the image reading device according to claim 4 further configured to read an image of a document; and
    an image recording device configured to record the image read by the image reading device on a recording medium.

6. The document feeder according to claim 1, wherein the guide member is a film-shaped Mylar having one end fixed to the document loading unit, and the other end protruding to cover the separation roller at an upstream side of the nip in a document feeding direction.

7. An image reading device comprising:
    an image capturing member configured to read an image of a document; and
    the document feeder according to claim 6 further configured to feed the document to a reading position where the image capturing member is configured to read the document.

8. An image forming apparatus comprising:
    the image reading device according to claim 7 further configured to read an image of a document; and
    an image recording device configured to record the image read by the image reading device on a recording medium.

9. An image reading device comprising:
    an image capturing member configured to read an image of a document; and
    the document feeder according to claim 1 further configured to feed the document to a reading position where the image capturing member is configured to read the document.

10. An image forming apparatus comprising:
    the image reading device according to claim 9 further configured to read an image of a document; and
    an image recording device configured to record the image read by the image reading device on a recording medium.

11. The document feeder according to claim 1, wherein a projection of the document loading unit is configured to abut a projection of the separation unit such that as the document loading unit moves from the loading position to the opened position, the pressure contact between the feed roller and the separation roller is removed and the guide member is removed from between the feed roller and the separation roller without contacting either of the feed roller and the separation roller.

12. A document feeder comprising:
   a document loading unit is configured to be loaded with a document thereon and supported to be movable between (i) a loading position where the document can be loaded and (ii) an opened position where a space at a lower side of the document loading unit in a direction of gravity is opened;
   a separation unit including a feed roller and a separation roller, the separation roller being in pressure contact with the feed roller, wherein the separation unit is configured to separate the document fed from the document loading unit by a nip formed between the feed roller and the separation roller; and
   a guide member configured to guide the document fed from the document loading unit to the nip of the separation unit,
   wherein when the document loading unit moves to the opened position, the separation roller and the guide member move to be spaced apart from each other,
   wherein the document loading unit includes a projection portion disposed at one end side thereof to protrude toward the separation unit,
   wherein the separation roller is rotatably supported on a retaining member that retains the separation roller to be movable between a separation position where the nip is formed and a retraction position where the nip is released, and
   wherein when the document loading unit moves to the opened position, the guide member moves toward an upstream side in a document feeding direction, and the nip is released as the projection portion comes into contact with an arm portion provided on the retaining member to protrude, so that the separation roller moves toward a downstream side in the document feeding direction.

* * * * *